United States Patent [19]
LeGrand

[11] 3,784,989
[45] Jan. 15, 1974

[54] HIGH-DENSITY RELAX-TRANSPORT SYSTEM

[76] Inventor: Pierre LeGrand, 98 Rue de Rennes, Paris, France

[22] Filed: July 10, 1972

[21] Appl. No.: 270,164

[30] Foreign Application Priority Data
July 20, 1971 France .............................. 71.26437
Oct. 25, 1971 France .............................. 71.38309

[52] U.S. Cl. ................. 5/9 R, 105/316, 244/118 P, 297/244
[51] Int. Cl... A47c 19/20, B61d 31/00, B64d 11/00
[58] Field of Search ................ 244/118 P; 5/8, 9 R; 297/458, 468, 245, 244, DIG. 1; 105/320, 314, 315, 316; 27/2, 7, 35; 206/46 FC, 65 R; 220/97 R, 97 F, 23.4, 23.6

[56] References Cited
UNITED STATES PATENTS
| | | | |
|---|---|---|---|
| 104,485 | 6/1870 | Morse | 105/320 |
| 3,124,389 | 3/1964 | Mikan | 297/458 |
| 376,629 | 1/1888 | Braund | 27/7 |
| 3,156,500 | 11/1964 | Kerr | 297/DIG. 1 |
| 1,702,827 | 2/1929 | Gustaveson | 297/244 |
| 2,480,322 | 8/1949 | Cozzoli | 244/118 P |
| 3,241,661 | 3/1966 | Zamzow et al. | 206/46 FC |
| 3,515,267 | 6/1970 | Rocca et al. | 206/46 FC |

*Primary Examiner*—Duane A. Reger
*Assistant Examiner*—Galen L. Barefoot
*Attorney*—William B. Kerkam, Jr.

[57] ABSTRACT

A high-density relax-transport system, intended especially to equip the useful space of means of transit and transport, fundamentally characterized by its arrangement in this space, in a compact interlocking structure, of a certain number of individual berths. These berths are formed of couchettes whose flexible and/or rigid bottoms have an at least transversally concave general shape and whose widths decrease advantageously toward the extremities, particularly from the hips to the feet. The said interlocking is so conceived that each couchette berth is limited to the functional volume required to permit the occupant's movements, with a generous space allowance in the torso and head region.

5 Claims, 4 Drawing Figures

HIGH-DENSITY RELAX-TRANSPORT SYSTEM

A relax unit, in particular the "Relaxator" sold in France by the firm Materiel Chirurgical Moderne, molds the body laterally, curves the back, and raises the head and legs slightly. This position rests the heart and relaxes the nerves and muscles of the user, asleep or awake. But the space the unit takes up has limited it, until now, to use in the home or in a spacious relaxation area.

The present invention extends its advantages to all restricted spaces, in transit or transport, by sea, land, rail, air or space, with a profitable occupant density and good fluidity of internal traffic, by means of an ingenious vertical and/or horizontal head-to-foot interlocking of a series of individual cellular berths, whose bottoms are all relax surfaces.

Each berth, offering functional ease, is open on only one side, bordered by the access corridor, and closed at will by a sliding curtain. Thus undesirable personal contact and the foot fatigue of an upright position are avoided. Furthermore, the body, firmly supported in its relax unit, withstands accelerations with comfort and shocks with safety. For this reason, in a vehicle it is normally preferable to arrange the berths longitudinally.

The flexible and/or rigid relax surfaces are formed, for instance, of molded plastic and/or of fabric stretched over a tubular frame; and cushions under the head, the back, or the legs adapt a single relax contour to various body conformations.

In the terms of the invention, the above-mentioned interlocking arrangement of berths saves space in three dimensions :

First, in length, since a relax unit is shorter than the height of its occupant.

Second, in height, since a first characteristic of the high-density relax transport system proposes an approximately vertical superposition of berths parallel one to another, but of alternate orientation from one level to the next, so that each occupant is head-to-foot with respect to his immediate upper and lower neighbors.

This vertical stacking can equip vertical, sloping, or bulging surfaces.

This characteristic of the invention is essential, since the alternately superimposed relax contours functionally increase the space available at the head-and-torso end of each berth, at the expense of the feet.

Let us call the "level" of a berth the lowest point of the relax contour, near the buttocks, and "comfort height" the difference between this low point and the high point at the head of the berth. It matters little that these two points are not on the same vertical line, since comfort is appreciated in terms of the curvature of the torso in the relax unit.

For instance, in a practical numerical example, a space of 47 cm between levels gives a comfort height of 80 cm, and makes it possible to fit four layers in a vertical space of 250 cm; the two lower levels, at 30 and 77 cm from the floor, are as easy to get into as ordinary seats, and the two upper levels, at 124 and 171 cm, can be reserved for peak periods. In comparison, a railroad car of the same height has only three levels of flat couchette berths; the comfort height is 65 cm, it is not possible to sit up, and the berths are uncomfortable despite their thickness. And only the bottom couchette is directly accessible.

Third, in width, since, according to a second characteristic of the invention, preferably applied with the first, the berth relax contours have, in plan view, a generally trapezoidal shape. They are arranged two by two, head-to-foot, at least in part, and at the same or a similar height, so as to be inscribed, still in plan view, in a preferably rectangular outline. For instance, two relax units allowing 60 cm at the head and 30 cm at the foot have a total width of 90 cm, instead of 120 cm.

Furthermore, local differences in height make it possible for each occupant to extend an elbow under his neighbor's leg.

Together, these two characteristics give a "relax-cell" in the form of a rectangular parallelepiped, in which each berth is basically a truncated pyramid set on its side, whose edges are curved, according to the relax contour, whose bases have down a large side at the head and short at the foot, and whose bottom and top are the two superimposed, inverse trapezoidal relax contours.

This shape analogy is only approximate, inasmuch as the berths are in contact along shared complementary skew surfaces to use the full available volume, and inasmuch as the two berths at the same level are partially offset so as to provide an additional personal space at the head of each berth.

A third characteristic proposes arranging a longitudinal series of relax-cells so as to form, through the continuity of their honeycomb structure, one or several "cell-beams" which can contribute to vehicle rigidity. And a fourth characteristic, that one or more of these cell-beams can provide internal support to the seams of the longitudinal lobes of an oval-section pressurized aircraft fuselage.

The four figures enclosed are illustrations of the practical application of this technique.

FIGS. 1 et 2 represent a relax-cell in plan and in elevation respectively.

Figure 1:
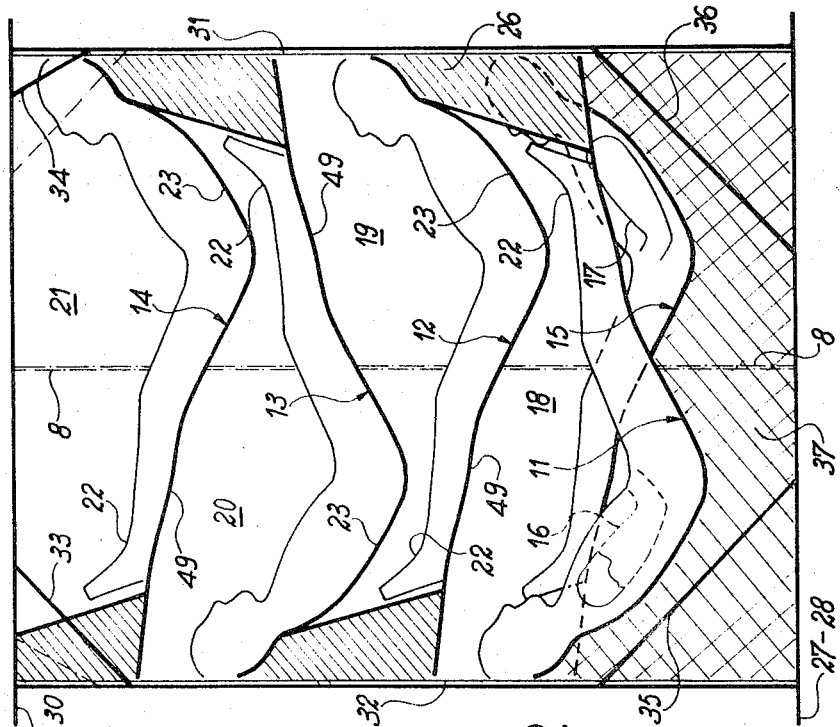

FIG. 1 shows a pair of trapezoidal relax berths 1 and 2 in head-to-foot arrangement, separated by a partition segment 3. These relax units are slightly offset longitudinally, and the assembly fits into rectangle 4, flanked by corridors 5 and 6. This pair of relax berths corresponds to either the first or the third level of FIG. 2. The second and fourth levels would give, superimposed on FIG. 1, a mirror-image head-to-foot arrangement, with a separating partition segment 7, shown dotted. These plane segments 3 and 7 are connected by skew surfaces, so as to form a continuous partition, within the relax-cell structure, completely isolating the occupants one from another. This partition contains a central vertical member 8, which can support acessories, such as a small folding table.

In FIG. 1, the lightly-shaded areas indicate the space saving : 9 that due to the relax contour, and 10 that due to the head-to-foot structure, compared to flat, parallel couchettes.

Figure 2:
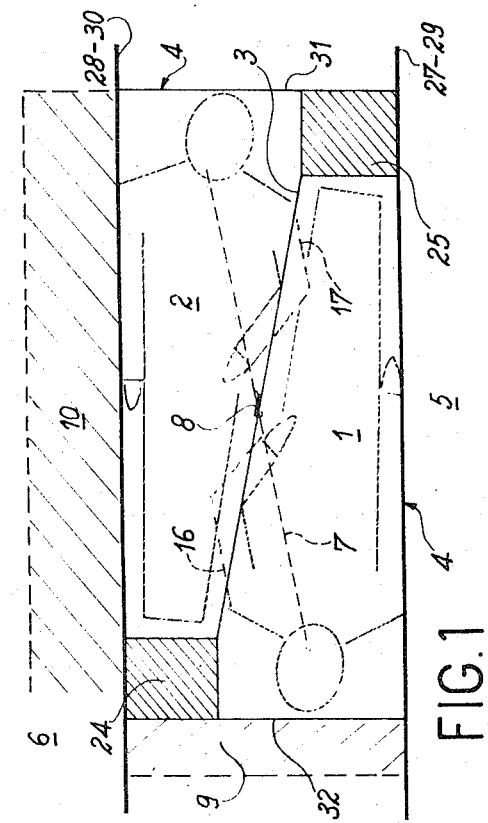

FIG. 2 shows the four foreground occupants, along corridor 5, on their contour berths shown in heavy line 11,12,13,14; at the lowest level, an occupant of the background group is shown on his unit 15, in the opposite orientation to 11. And in FIGS. 1 and 2 can be seen an elbow 16 or 17 extended under the leg of the occupant of the neighboring berth.

There are two essential combinations: first, that of contour 23 with contour 49 which provides the large torso volumes 18,19,20,21, and,second, that of the lower leg and ankle contour 22 with the back curvature 23 which allows excellent freedom of movement for the legs, despite the limited height available at this location.

The longitudinal offset position of the berths provides personal storage spaces, shown in darker shading on the plan view, as 24 for berth 1, and 25 for berth 2. In the elevation view, the corresponding shading shows the spaces available for the more distant group, as 26 for the occupant of berth 15.

The access ladder for the two upper layers of berths is not shown, and may be, movable, on the opposite side of the corridor, or pivoting at the end of the relax-cell.

The relax-cell is braced by 27 and 28 lower, and 29 and 30 upper, horizontal members, and by the continuous partition 3 and 7, structurally bound to the vertical partitions 31 and 32 and to the upper and lower cell plates. Cross-braces 33,34,35 and 36 further strengthen the structure.

In an aircraft cell-beam, the vertical partitions 31 and 32 can be curved forward, in the direction of motion, for better stress resistance in the event of a crash.

At the bottom of FIG. 2, the double shading 37 shows the enclosed, shared baggage space.

Figure 3:
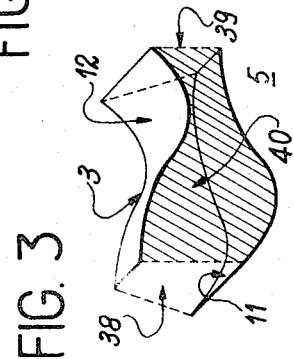
FIG. 3 is a scheme of the volume of the typical berth.

FIG. 3 shows the principle of individual berths, which fit exactly against other analogous and complementary berths, so as to form a relax-cell. To simplify this presentation, the longitudinal offset and the individual baggage spaces are not shown, though the other indications are carried over from FIGS. 1 and 2.

This berth is bounded: first, above and below, by two relax contours 11 and 12, in head-to-foot arrangement; second, at the extremities, by two end panels, 38 at the head and 39 at the foot; and third, laterally, by side surfaces,3, a partition shared with the unit behind, and 40, shown shaded, opening along the near side onto the corridor 5.

This relax-cell has a wide range of applications:

At first, as a container between two corridors, in a small transport vehicle for workers during the week, for excursions weekends, for longer distances during long vacations, or indeed in transport helicopters.

But generally, it can also be used in the form of longitudinal cell-beams in a railroad car, in an overland bus, or in an aircraft of one or more decks.

Figure 4:
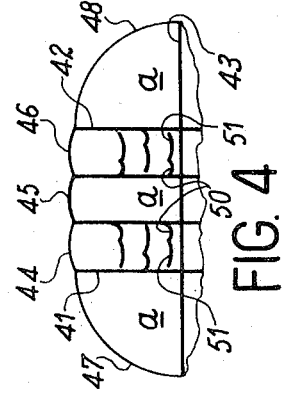
FIG. 4 is a partial section view of the upper portion of a high-capacity pressurized aircraft fuselage, showing support of the lobe structure.

FIG. 4 shows two three-level cell-beams of head-to-foot relax berths (shown as 50 and 51) above floor 43 and bounded by corridors "a"; the cell-beams are designated 41 and 42. These cell-beams support three small upper lobes 44,45, and 46, which ovalize the section and increase its capacity, by separating two main semicircular lobes 47 and 48.

In these continuous cell-beams, relax can at intervals be replaced by intercorridor passageways, or by service facilities such as toilets or storage areas.

This relax-transport system can thus be adopted for its comfort, its safety, its light weight, and/or its large, variable capacity and hence its economy.

Possible applications are by no means limited to the examples given.

What I claim is:

1. A high density relax transport system for the useful space of passenger transit and transport means comprising the arrangement in this space in a compact interlocking structure of a plurality of individual berths, said berths being relax couchettes having the shape of a relaxed person with head and feet slightly raised, a plurality of said berths being disposed in a vertical array one above the other, a plurality of said berths being disposed in a horizontal array each parallel to and opposite to a berth in the adjacent vertical array and in head to foot position, the height of each berth with respect to the berth thereabove increasing from the foot to the head providing maximum free height adjacent the bust and head of the passenger.

2. A system as described in claim 1, said berths in said structure being juxtaposed two by two and head to foot at substantially the same level, the sections of two of said berths in horizontal plan being complementary and completely filling the horizontal space occupied by the two berths.

3. A system as described in claim 2, each of said berths being substantially trapezoidal in horizontal plan and two adjacent ones of said berths in horizontal plane being juxtaposed to form a rectangular plan.

4. Equipement according to claim 3, including at least one relax-cell occupying generally a structured rectangular parallelepiped bounded by two corridors for lateral access to its berths, each cell being formed, on at least one level, by two trapezoidal berths juxtaposed head-to-foot at similar height, inscribed in plan in the said rectangle, and separated by a partition generally vertical, but inclined with respect to the sides of said rectangle, the orientation of the pairs of berths and of the separating partitions alternating from level to level.

5. Equipement according to claim 4, in which several cells arranged in longitudinal series form, through continuity of structure, at least one lattice beam contributing to vehicle rigidity.

* * * * *